A. F. HENDERSON.
WIRE ENGAGING BATTERY TERMINAL.
APPLICATION FILED MAR. 15, 1917.
1,255,310.   Patented Feb. 5, 1918.
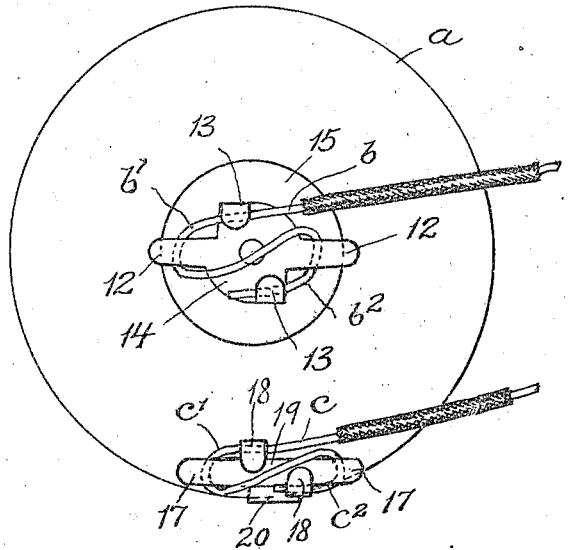
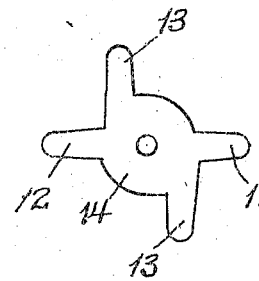
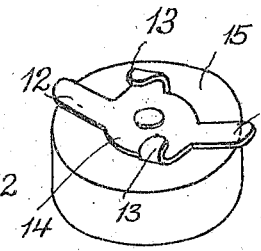
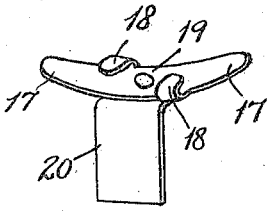
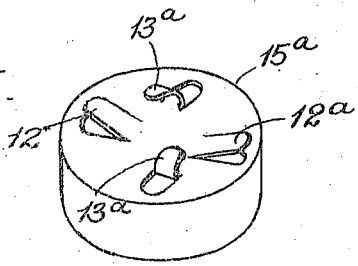
INVENTOR:
A. F. Henderson
by Wright Brown Quinby & May
ATTY'S.

UNITED STATES PATENT OFFICE.

ALBERT F. HENDERSON, OF MIDDLETON, MASSACHUSETTS.

WIRE-ENGAGING BATTERY-TERMINAL.

1,255,310.   Specification of Letters Patent.   Patented Feb. 5, 1918.

Application filed March 15, 1917. Serial No. 154,941.

*To all whom it may concern:*

Be it known that I, ALBERT F. HENDERSON, a citizen of the United States, residing at Middleton, in the county of Essex and State of Massachusetts, have invented new and useful Improvements in Wire-Engaging Battery-Terminals, of which the following is a specification.

This invention relates to the wire-engaging terminals connected with the poles of a dry cell or other battery, and has for its object to eliminate the binding-post and screw usually provided to mechanically and electrically connect a conducting wire with a battery terminal, and enable the terminal to securely confine and have extended contact with a plurality of bights or loops of a conducting wire.

The invention is embodied in the improvements which I will now proceed to describe and claim.

Of the accompanying drawings forming a part of this specification,—

Figure 1 is an end view of a dry cell battery having terminals embodying my invention.

Fig. 2 is a perspective view of a portion of the positive pole terminal shown by Fig. 1.

Fig. 3 is a side view of the blank from which the portion shown by Fig. 2 is made.

Fig. 4 is a perspective view of the negative pole terminal shown by Fig. 1.

Fig. 5 is a view similar to Fig. 2, showing a different construction.

The same reference characters indicate the same parts in all of the figures.

$a$ may represent an ordinary cylindrical dry cell battery having the usual central positive pole, and the usual marginal negative pole, said poles being provided with terminals having means for engaging the usual conducting wires $b$, $c$.

In carrying out my invention, I construct each terminal as a cleat adapted to engage and hold down a plurality of bights or loops, such as $b'$, $b^2$, and $c'$, $c^2$ of the wires $b$, $c$.

The terminal of the positive pole, as here shown, includes oppositely projecting spaced-apart cleat arms 12, 12, raised at their outer ends to permit the neck portions of the bights $b'$, $b^2$ to pass under said arms, and oppositely facing hooked ears 13, 13, adapted to overhang portions of said bights and laterally confine the bights, or prevent the same from spreading.

The arms 12 and ears 13 may be formed from a blank shaped as shown by Fig. 3, and including a neck or body portion 14 electrically and mechanically connected in any suitable way with the positive pole. For example, the neck or body 14 may be soldered, riveted or otherwise secured to a sheet metal cap 15, which may be considered as representing an ordinary terminal, such as has heretofore been provided with a wire-engaging binding-post and screw. If desired, however, the arms 12 and ears 13 may be integral parts of the cap, as shown by Fig. 5, in which $15^a$ represents the cap, $12^a$ the cleat arms and $13^a$ the hooked arms. The body portion of the cleat has a substantially flat outer face of considerable area, against which elongated portions of the conducting wire bights are held by the cleat arms, so that sufficient electrical contact is insured. The hooked ears prevent side slip of said elongated portions in the plane of said face.

The terminal of the negative pole, as here shown, includes oppositely projecting spaced-apart cleat arms 17, 17, raised at their outer ends to permit the neck portions of the bights $c'$, $c^2$ to pass under said arms, and oppositely facing hooked ears 18, 18, adapted to overhang portions of said bights, and laterally confine the same. The neck or body 19 connecting said arms and ears has a substantially flat outer face, against which elongated portions of the wire bights are held. Said neck or body may be connected with the negative pole of the battery by an angular member 20, one arm of which may be soldered, riveted or otherwise attached to said neck, the other arm overlapping a portion of the negative pole (which is usually cylindrical) and being suitably secured thereto. It is obvious however that the member 20, the neck 19, the arms 17, and the ears 18 may be made from a single blank. Conducting wires may be quickly and conveniently connected with and disconnected from the described terminals. When connected, the wires are securely confined against displacement in any direction, and have a much more extended and effective contact with the terminals than would be possible if they were secured by ordinary binding-posts and screws.

The described battery terminal formed as a cleat may be advantageously made of sheet metal, and therefore at a minimum cost.

I claim:

1. A wire-engaging battery terminal formed as a cleat composed of a body portion having a substantially flat outer face, and arms projecting from opposite edges of the body portion and adapted to engage portions of conducting wire bights and hold elongated portions of said bights in contact with said face.

2. A wire-engaging battery terminal formed as a cleat composed of a body portion having a substantially flat outer face, arms projecting from opposite edges of the body portion and adapted to engage portions of conducting wire bights and hold elongated portions of said bights in contact with said face, said cleat being provided with means for preventing side slip of said elongated bight portions on said face.

3. A wire-engaging battery terminal comprising a body portion, oppositely projecting spaced-apart cleat arms raised at their outer ends above the body portion, and adapted to engage and hold down bights of a conducting wire, and oppositely facing hooked ears adapted to laterally confine said bights.

In testimony whereof I have affixed my signature.

ALBERT F. HENDERSON.